(12) United States Patent
Krivenok et al.

(10) Patent No.: US 12,112,075 B1
(45) Date of Patent: Oct. 8, 2024

(54) DYNAMICALLY INCREASING PERFORMANCE OF A VIRTUAL STORAGE APPLIANCE THAT USES MULTI-ATTACH CLOUD STORAGE VOLUMES

(71) Applicant: Dell Products L.P., Round Rock, TX (US)

(72) Inventors: Dmitry Vladimirovich Krivenok, Dublin (IE); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/204,450

(22) Filed: Jun. 1, 2023

(51) Int. Cl.
*G06F 3/06* (2006.01)

(52) U.S. Cl.
CPC .......... *G06F 3/0664* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | |
|---|---|---|
| 11,263,032 B1 | 3/2022 | Nallamalli et al. |
| 11,321,188 B2 | 5/2022 | Mitkar et al. |
| 11,366,600 B2 | 6/2022 | Gunasekaran et al. |
| 11,397,649 B2 | 7/2022 | Sharma et al. |
| 2017/0160951 A1* | 6/2017 | Borlick .................. G06F 3/0631 |
| 2018/0157444 A1* | 6/2018 | Franciosi ................. G06F 3/067 |
| 2020/0019343 A1* | 1/2020 | Bronnikov ............ G06F 3/0664 |
| 2020/0310658 A1* | 10/2020 | Singh .................. H04L 67/1097 |
| 2022/0035541 A1* | 2/2022 | Genereux ............... G06F 3/067 |
| 2024/0168923 A1* | 5/2024 | Sinha .................. G06F 16/1734 |
| 2024/0193125 A1* | 6/2024 | Emberson ............. G06F 16/125 |

FOREIGN PATENT DOCUMENTS

WO   WO-2016160041 A2 *  10/2016  ........... G06F 3/0607

* cited by examiner

*Primary Examiner* — Kaushikkumar M Patel
(74) *Attorney, Agent, or Firm* — BainwoodHuang

(57) ABSTRACT

Multi-attach cloud storage volumes are directly attached to data storage interfaces of multiple storage controllers in a virtual storage appliance, and the storage controllers of the virtual storage appliance initially access the cloud storage volumes through the data storage interfaces. In response to a low performance condition, a virtual disk instance is created, and the cloud storage volumes are additionally directly attached to the virtual disk instance. A sub-network is created that connects the virtual disk instance to network interfaces of the storage controllers of the virtual storage appliance, and the storage controllers subsequently access the cloud storage volumes through both the data storage interfaces and the network interfaces of the storage controllers of the virtual storage appliance.

19 Claims, 5 Drawing Sheets

DYNAMICALLY INCREASING PERFORMANCE OF A VIRTUAL STORAGE APPLIANCE THAT USES MULTI-ATTACH CLOUD STORAGE VOLUMES

TECHNICAL FIELD

The present disclosure relates generally to data storage systems, and more specifically to technology for providing backend non-volatile data storage to a virtual storage appliance.

BACKGROUND

A Virtual Storage Appliance (VSA) is a software appliance including storage controllers (also referred to as "nodes") that are virtual machines (also referred to as "instances") provided by a cloud computing platform. During operation, the VSA processes host I/O requests received by the VSA from virtual or physical host machines (also referred to as "hosts"). The host I/O requests received and processed by the VSA specify user data that is written and/or read by the hosts. The VSA includes software logic that processes host I/O requests by performing various data processing tasks to efficiently organize and persistently store the specified user data in user accessible storage objects that are built by the VSA.

Performance of a VSA often reflects data storage performance limits of the virtual machine instance types that are used for the storage controllers of the VSA. Using instance types with high data storage performance limits for the VSA storage controllers increases the total cost of ownership for the VSA.

SUMMARY

In the disclosed technology, multiple cloud storage volumes are directly attached to the data storage interface of each one of multiple storage controllers of a virtual storage appliance. The storage controllers of the virtual storage appliance initially access the cloud storage volumes through the data storage interfaces of the storage controllers. In response to detecting a low performance condition for the virtual storage appliance, the virtual storage appliance creates at least one virtual disk instance, and directly attaches the cloud storage volumes to the virtual disk instance. The virtual storage appliance then creates a sub-network that connects the virtual disk instance to network interfaces of the storage controllers of the virtual storage appliance. The storage controllers of the virtual storage appliance subsequently access the cloud storage volumes through both the data storage interfaces and the network interfaces of the storage controllers of the virtual storage appliance, to store user data received by the virtual storage appliance from one or more host devices in the cloud storage volumes.

In some embodiments, each one of the cloud storage volumes is capable of being attached to multiple virtual machines, each one of the multiple storage controllers is a virtual machine, the virtual disk instance is also a virtual machine, and each one of the cloud storage volumes is directly attached to the virtual disk instance through a data storage interface of the virtual disk instance.

In some embodiments, detecting the low performance condition for the virtual storage appliance includes detecting that access time for accessing the cloud storage volumes has exceeded a threshold access time.

In some embodiments, detecting the low performance condition for the virtual storage appliance includes detecting that a queue depth of at least one queue storing user data to be persistently stored in the cloud storage volumes has exceeded a threshold queue depth.

In some embodiments, increasing the total data storage capacity of the virtual storage appliance is accomplished by calculating an amount of increase in the total data storage capacity for the virtual storage appliance, calculating a per-cloud storage volume increment by dividing the amount of increase in the total data storage capacity for the virtual storage appliance by a total number of the cloud storage volumes, and increasing a data storage capacity of each one of the cloud storage volumes by the per-cloud storage volume increment.

In some embodiments, increasing the total data storage capacity of the virtual storage appliance further includes detecting, by the storage controllers of the virtual storage appliance, the increased data storage capacities of the cloud storage volumes, and using, by the storage controllers of the virtual storage appliance, the increased data storage capacities of the cloud storage volumes to persistently store the user data received by the virtual storage appliance from the one or more host devices.

In some embodiments, increasing a total data storage capacity of the virtual storage appliance is accomplished at least in part by creating a new cloud storage volume, directly attaching the new cloud storage volume to the data storage interfaces of the storage controllers of the virtual storage appliance, and detecting, by the storage controllers of the virtual storage appliance, the new cloud storage volume through the data storage interfaces of the storage controllers of the virtual storage appliance. The new cloud storage volume is directly attached to the data storage interface of the of the virtual disk instance, and detected by the virtual disk instance. The new cloud storage volume is exposed by the virtual disk instance over the subnetwork to the storage controllers of the virtual storage appliance. The storage controllers of the virtual storage appliance discover the new cloud storage volume through the network interfaces of the storage controllers of the virtual storage appliance, and subsequently access the new cloud storage volume through both the data storage interfaces and the network interfaces of the storage controllers of the virtual storage appliance, to persistently store user data subsequently received by the virtual storage appliance from the one or more host devices in the new cloud storage volume. The virtual storage appliance may also adjust IOPS performance of all cloud storage volumes down after adding the new cloud storage volume, so that the total IOPS performance for the virtual storage appliance is the same as it was before adding the new cloud storage volume.

In some embodiments, the IOPS (Input/Output Operations per Second) performance of the virtual storage appliance is increased at least in part by creating a new virtual disk instance, directly attaching the cloud storage volumes to a data storage interface of the new virtual disk instance, and detecting, by the new virtual disk instance, the cloud storage volumes. The cloud storage volumes are exposed by the new virtual disk instance to the multiple storage controllers of the virtual storage appliance over the subnetwork. At least one new path to the cloud storage volumes is discovered, by the storage controllers of the virtual storage appliance, over the sub-network and through the new virtual disk instance. The storage controllers of the virtual storage appliance subsequently access the cloud storage volumes at least in part over the at least one new path to the cloud storage volumes, to persistently store user data subsequently received by the virtual storage appliance from the one or more host devices in the new cloud storage volume.

In some embodiments, increasing the IOPS performance of the virtual storage appliance by creating a new virtual disk instance may further include calculating an amount of increase in the IOPS performance of the virtual storage appliance, calculating a per-cloud storage volume increment by dividing the amount of increase in the IOPS performance of the virtual storage appliance by a total number of the cloud storage volumes, and increasing an IOPS performance of each one of the cloud storage volumes by the per-cloud storage volume increment.

Because the performance increases provided by the disclosed technology may increase costs, the disclosed technology may be embodied such that any automatic performance increases are performed only after a user has explicitly requested that such automatic increases be performed.

In addition to the disclosed automatic increases in performance, a performance increase provided by the disclosed technology may also be manually triggered by a user at any time.

The disclosed technology is integral to a practical and cost-effective technical solution for dynamically increasing performance of backend non-volatile data storage for a virtual storage appliance in a cost effective manner. The disclosed technology allows the performance of backend non-volatile data storage for a virtual storage appliance to be increased dynamically while maintaining a low total cost of ownership for the virtual storage appliance. By adding at least one virtual disk instance to provide additional access to multi-attach cloud storage volumes used for backend storage, the disclosed technology avoids the need to use expensive virtual machine instance types as storage controllers of the virtual storage appliance, which would otherwise be needed to provide higher storage access performance. In addition, the disclosed technology advantageously allows a virtual storage appliance to independently increase its IOPS performance without increasing the total data storage capacity of the virtual storage appliance. The disclosed technology also allows the virtual storage appliance to independently increase its total data storage capacity without requiring it to increase its IOPS performance at the same time.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
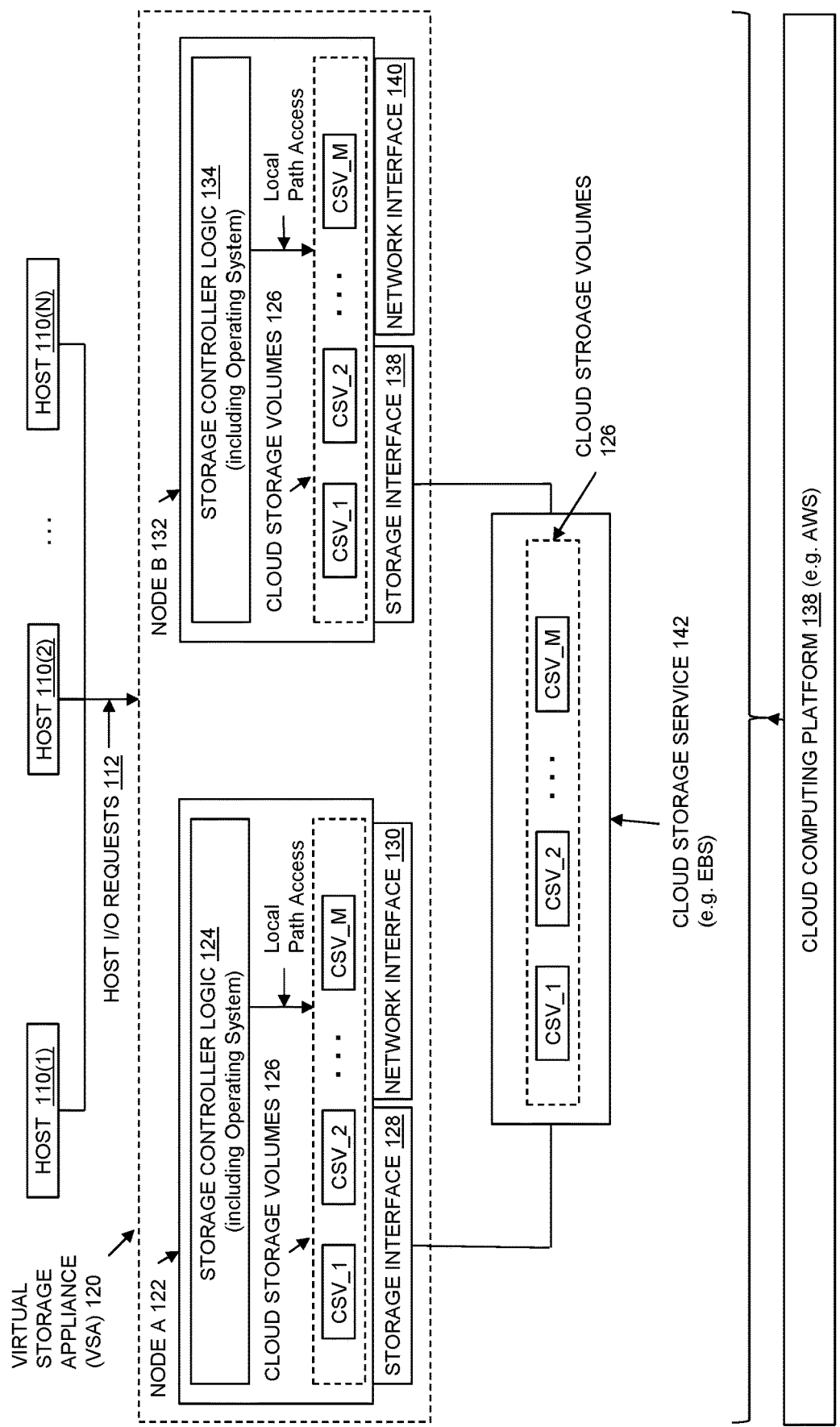
FIG. 1 is a block diagram showing an example of a virtual storage appliance and multi-attach cloud storage volumes providing backend non-volatile storage for the virtual storage appliance in an initial configuration.

Embodiments will now be described with reference to the figures. The embodiments described herein are provided only as examples, in order to illustrate various features and principles of the disclosed technology, and are not limiting. The embodiments of disclosed technology described herein are integrated into a practical solution for dynamically increasing performance with regard backend non-volatile data storage of a virtual storage appliance.

In the disclosed technology, multiple cloud storage volumes are directly attached to the data storage interface of each one of multiple storage controllers of a virtual storage appliance. The storage controllers of the virtual storage appliance initially access the cloud storage volumes through the data storage interfaces of the storage controllers. A low performance condition is then detected, and in response to detecting the low performance condition, the virtual storage appliance creates at least one virtual disk instance, and directly attaches the cloud storage volumes to the virtual disk instance. A sub-network that connects the virtual disk instance to network interfaces of the storage controllers of the virtual storage appliance is then created by the virtual storage appliance. The storage controllers of the virtual storage appliance subsequently access the cloud storage volumes through both i) the data storage interfaces, and ii) the network interfaces of the storage controllers of the virtual storage appliance, in order to store user data received by the virtual storage appliance from one or more host devices.

Further in the disclosed technology, each one of the cloud storage volumes is a "multi-attach" storage volume that is capable of being attached to multiple virtual machines. Each one of the multiple storage controllers is a virtual machine, and the virtual disk instance is also a virtual machine. The cloud storage volumes are each directly attached to the virtual disk instance through a data storage interface of the virtual disk instance.

The low performance condition detected by the virtual storage appliance may be an access time for accessing the cloud storage volumes exceeding a threshold maximum access time. The low performance condition for the virtual storage appliance may alternatively, or in addition, include detecting that a queue depth of at least one queue storing user data that is to be persistently stored in the cloud storage volumes has exceeded a threshold maximum queue depth.

Increasing the total data storage capacity of the virtual storage appliance may be accomplished by the virtual storage appliance calculating a desired amount of increase in the total data storage capacity of the virtual storage appliance, and then calculating a per-cloud storage volume increment by dividing the amount of increase in the total data storage capacity for the virtual storage appliance by a total number of the cloud storage volumes. The data storage capacity of each one of the cloud storage volumes is then increased by the per-cloud storage volume increment.

Increasing the total data storage capacity of the virtual storage appliance may further include detecting, by the storage controllers of the virtual storage appliance, the increased data storage capacities of the cloud storage volumes, and then using, by the storage controllers of the virtual storage appliance, the increased data storage capacities of the cloud storage volumes to persistently store the user data received by the virtual storage appliance from the one or more host devices.

Figure 2:
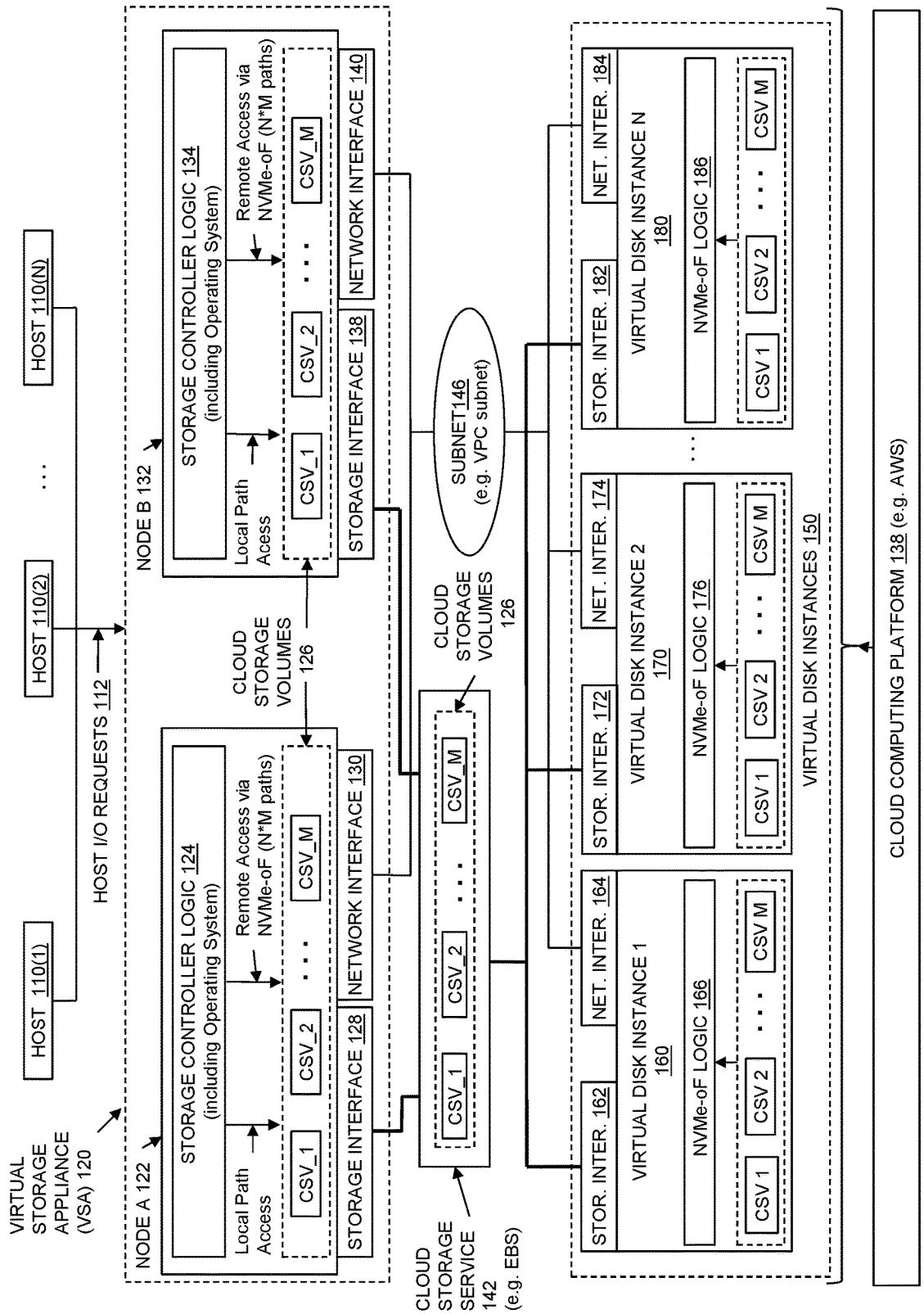
FIG. 2 is a block diagram showing an example of the virtual storage appliance and multi-attach cloud storage volumes shown in FIG. 1 after the creation of at least one virtual disk instance.

FIG. 1 shows an example of a Virtual Storage Appliance (VSA) 120 and multi-attach Cloud Storage Volumes 126 providing backend non-volatile storage for Virtual Storage Appliance 120 in an initial configuration. As further described below, FIG. 2 shows an example of the Virtual Storage Appliance 120, and Cloud Storage Volumes 126 shown in FIG. 1 after the creation of one or more virtual disk instances, e.g. after the creation of Virtual Disk Instances 150. VSA 120 executes on a public cloud computing platform, shown by Cloud Computing Platform 138. VSA 120 includes multiple storage controllers, shown in FIG. 1 by Node A 122 and Node B 132. Cloud Computing Platform 138 may include a hypervisor or the like, executing on one or more server computer systems, and Node A 122 Node B 132 are virtual machines that each execute on Cloud Computing Platform 138 as an instance of a virtual machine type provided by Cloud Computing Platform 138. Each one of the Virtual Disk Instances 150 (see FIG. 2) is also a virtual machine, and also executes on Cloud Computing Platform 138 as an instance of a virtual machine type provided by Cloud Computing Platform 138. Each instance provided by Cloud Computing Platform 138 is an instance of a virtual machine type defined by Cloud Computing Platform 138, and is subject to performance constraints on that type of instance, e.g. limits on data storage interface IOPS, network interface throughput, etc., as are defined for that type by the Cloud Computing Platform 138.

Cloud Computing Platform 138 may, for example, consist of or include Amazon Web Services (AWS) operated by Amazon.com, Inc., Azure operated by Microsoft Corporation, and/or some other specific cloud computing platform. Node A 122, Node B 132, and Virtual Disk Instances 150 (FIG. 2) are program code (software) that executes on cloud resources of Cloud Computing Platform 138 provisioned from Cloud Computing Platform 138 for execution of Node A 122, Node B 132, and the Virtual Disk Instances 150. Such resources may include one or more processors (e.g., one or more central processing units (CPUs)), memory, and storage I/O and network communication interface resources of one or more server computer systems in Cloud Computing Platform 138.

Node A 122, Node B 132, and the Virtual Disk Instances 150, together with the cloud compute and other resources of Cloud Computing Platform 138 that are provisioned from Cloud Computing Platform 138 for execution of Node A 122, Node B 132, and the Virtual Disk Instances 150, form control circuitry that is configured and arranged to carry out various methods and functions described herein. Node A 122, Node B 132, and the Virtual Disk Instances 150 include a variety of software components that may be provided in the form of executable program code. For example, Node A 122 and Node B 132 may respectively include software components such as Storage Controller Logic 124 and Storage Controller Logic 134. Each one of the virtual disk instances may include its own program code, e.g. NVMe-oF (Non-Volatile Memory Express over Fabrics) Logic 166 166 in Virtual Disk Instance 1 160, NVMe-oF Logic 176 in Virtual Disk Instance 2 170, and so on through NVMe-oF Logic 186 in Virtual Disk Instance N 180. When instructions in the program code are executed by the cloud compute resources of Cloud Computing Platform 138 provisioned for execution of Node A 122, Node B 132, and Virtual Disk Instances 150, those cloud compute resources are caused to carry out the operations of the software components described herein. Although certain software components are shown in the Figures and described herein for purposes of illustration and explanation, those skilled in the art will recognize that VSA 120 and/or Virtual Disk Instances 150 may also include various other specific types of software components that are not shown.

Host Computing Devices 110, referred to as "Hosts 110", are shown for purposes of illustration by Hosts 110(1) through 110(N). Hosts 110 may be virtual and/or physical computing devices. The Hosts 110 and/or applications executing thereon access non-volatile data storage served by VSA 120. For example, Hosts 110 issue Host I/O Requests 112 on behalf of applications executing on Hosts 110. Host I/O Requests 112 may include read and/or write I/O requests. VSA 120 receives Host I/O Requests 112, and Storage Controller Logic 124 and/or Storage Controller Logic 134 processes the Host I/O Requests 112. Processing of Host I/O Requests 112 includes using portions of non-volatile data storage from backend logical volumes, such as Cloud Storage Volumes 126, to create user accessible storage objects that store user data and are accessed by the Host I/O Requests 112. The user accessible storage objects may, for example, include file-level storage objects (e.g. files), and/or block-level storage objects (e.g. virtual disks), and Host I/O Requests 112 may include file-based and/or block-based I/O requests that access those storage objects.

The types and capabilities of the instances used for Node A 122, Node B 132, and each one of the virtual disk instances in Virtual Disk Instances 150, support an initial performance (e.g. IOPS) and total storage capacity for Virtual Storage Appliance 120. In embodiments in which the Cloud Computing Platform 138 is AWS, each of these virtual machines may, for example, be created using Amazon Elastic Compute Cloud (EC2), and may be an EC2 Nitro instance. Because the processing requirements of the Virtual Disk Instances 150 are relatively small, they can advantageously be deployed on less expense CPU resources of the Cloud Computing Platform 138, e.g. using ARM64 Graviton processors in AWS, thus reducing total cost of ownership.

Each one of the M backend cloud storage volumes in Cloud Storage Volumes 126 is capable of being attached to the data storage interface of multiple virtual machines (e.g. to Storage Interface 128 of Node A 122 and Storage Interface 138 of Node B 132, and also to each of the storage interfaces of the individual Virtual Disk Instances 150, e.g. to Storage Interface 162 of Virtual Disk Instance 1 160, Storage Interface 172 of Virtual Disk Instance 2 170, and so on through Storage Interface 182 of Virtual Disk Instance N 180). Accordingly, Cloud Storage Volumes 126 are created (e.g. using a Cloud Storage Service 142) as instances of a type that provides multi-attach capabilities. For example, in embodiments in which the Cloud Computing Platform 138 is AWS, each one of the cloud storage volumes in Cloud Storage Volumes 142 may be created as an io1 or io2 SSD (Solid State Drive) storage volume using Amazon Elastic Block Store (Amazon EBS). Both io1 and io2 are examples of cloud storage volume types that are capable of being attached to multiple virtual machines.

In the initial configuration shown in FIG. 1, each one of the M cloud storage volumes in Cloud Storage Volumes 126 is directly attached (e.g. by Storage Controller Logic 124 and/or Storage Controller Logic 134) to both i) the Data Storage Interface 128 of Node A 122, and ii) Data Storage Interface 138 of Node B 132. Initially, in order to persistently store user data received by Virtual Storage Appliance 120 from Hosts 110, the storage controllers Node A 122 and Node B 132 access Cloud Storage Volumes 126 directly through their data storage interfaces, e.g. Storage Controller Logic 124 accesses Cloud Storage Volumes 126 using a local path through Data Storage Interface 128, and Storage Controller Logic 134 accesses Cloud Storage Volumes 126 using a local path through Data Storage Interface 138.

While the components of the disclosed technology are in the initial configuration shown in FIG. 1, a low performance condition is detected by Virtual Storage Appliance 120, e.g. by Storage Controller Logic 124 or Storage Controller Logic 134. For example, detecting the low performance condition may consist of or include detecting that an access time (e.g. an average access time) for accessing Cloud Storage Volumes 126 by Node A 122 or Node B 134 has exceeded a threshold maximum access time. When the threshold maximum access time is exceeded, this is an indication that performance of the Virtual Storage Appliance 120 with regard to accessing the Cloud Storage Volumes 126 needs to be increased.

In another example, detecting the low performance condition may consist of or include detecting that a depth of a queue in Node A 122 or Node B 134 storing user data received from Hosts 110 that is to be persistently stored into Cloud Storage Volumes 126 has exceeded a threshold maximum queue depth. Such a queue may, for example, temporarily store received user data in entries that are dequeued in response to the user data they contain being successfully stored into Cloud Storage Volumes 126, i.e. when the user data has been "de-staged" from the Virtual Storage Appliance 120 to the Cloud Storage Volumes 126. When the number of entries currently stored in such a queue exceeds an acceptable maximum number, this is an indication that the performance of the Virtual Storage Appliance 120 with regard to accessing Cloud Storage Volumes 126 needs to be increased.

In response to detecting the low performance condition, as shown in FIG. 2, Virtual Storage Appliance 120 (e.g. Storage Controller Logic 124 and/or Storage Controller Logic 134) creates at least one virtual disk instance. In the example of FIG. 2, Virtual Storage Appliance 120 creates N virtual disk instances shown in Virtual Disk Instances 150. As shown in FIG. 2, Virtual Disk Instances 150 include Virtual Disk Instance 1 160, Virtual Disk Instance 2 170, and so on through Virtual Disk Instance N 180.

Further in response to detecting the low performance condition, as also shown in FIG. 2, Virtual Storage Appliance 120 (e.g. Storage Controller Logic 124 and/or Storage Controller Logic 134) directly attaches each one of the cloud storage volumes in the Cloud Storage Volumes 126 to each one of the virtual disk instances in Virtual Disk Instances 150. In the example of FIG. 2, Cloud Storage Volumes 126 are attached to Data Storage Interface 162 of Virtual Disk Instance 1 160, Data Storage Interface 172 of Virtual Disk Instance 2 170, and so on through Data Storage Interface 182 of Virtual Disk Instance N 180.

Further in response to detecting the low performance condition, as also shown in FIG. 2, Virtual Storage Appliance 120 (e.g. Storage Controller Logic 124 and/or Storage Controller Logic 134) also creates a sub-network that connects the network interface of each one of the Virtual Disk Instances 150 to the network interfaces of Node A 122 and Node B 132. This sub-network is shown in FIG. 2 by Subnet 146. Specifically, Subnet 146 connects the Network Interface 164 of Virtual Disk Instance 1 160, Network Interface 174 of Virtual Disk Instance 2, and so on, through Network Interface 184 of Virtual Disk Instance N 180, to both Network Interface 130 of Node A 122 and Network Interface 140 of Node B 132. Subnet 146 may, for example, be a subnet that is added to a Virtual Private Cloud (VPC) in the case where Cloud Computing Platform 138 is Amazon Web Services (AWS).

Each one of the virtual disk instances in Virtual Disk Instances 150 (e.g. the NVMe-oF logic in each virtual disk instance) detects that the Cloud Storage Volumes 126 have been attached to them directly through their data storage interfaces. The virtual disk instances in Virtual Disk Instances 150 (e.g. the NVMe-oF logic in each virtual disk instance) then expose the Cloud Storage Volumes 126 to Node A 122 and Node B 132 over Subnet 146, e.g. using the NVMe-oF protocol. Node A 122 and Node B 132 each discover a new remote path to each one of the M cloud storage volumes in Cloud Storage Volumes 126 over the Subnet 146 for each one of the N virtual disk instances in Virtual Disk Instances 150, for a total of N*M new remote paths. Node A 122 and Node B 132 subsequently access Cloud Storage Volumes 126 through both i) the local path to each cloud storage volume through their data storage interfaces (e.g. through Data Storage Interface 128 and Data Storage Interface 138), and ii) the N remote paths to each cloud storage volume over the Subnet 146 through their network interfaces (e.g. through Network Interface 130 and Network Interface 140), in order to store user data received by the Virtual Storage Appliance 120 from Hosts 110 into user accessible storage objects. In this way, by using the additional N remote data paths to each cloud storage volume over Subnet 146, the performance of Virtual Storage Appliance 120 can be increased by reducing the overall access time to backend non-volatile data storage provided by Cloud Storage Volumes 126.

Further during the operation of the components show in FIG. 2, the total data storage capacity of Virtual Storage Appliance 120 may be increased by Virtual Storage Appliance 120 (e.g. Storage Controller Logic 124 and/or Storage Controller Logic 134) first calculating a desired amount of increase in the total data storage capacity of the virtual storage appliance, e.g. equal to a desired total data storage capacity minus a current total data storage capacity. The Virtual Storage Appliance 120 then calculates a per-cloud storage volume increment, e.g. by dividing the desired amount of increase in the total data storage capacity by the total number of cloud storage volumes (M). Virtual Storage Appliance 120 then increases the data storage capacity of each one of the Cloud Storage Volumes 126 by the per-cloud storage volume increment.

Increasing the total data storage capacity of Virtual Storage Appliance 120 may further include Virtual Storage Appliance 120 (e.g. Storage Controller Logic 124 and/or Storage Controller Logic 134) detecting the increased data storage capacities of the individual cloud storage volumes in Cloud Storage Volumes 126. Node A 122 and Node B 132 then use the increased data storage capacities of the cloud storage volumes in Cloud Storage Volumes 126 to persistently store user data received by Virtual Storage Appliance 120 from the Hosts 110.

Figure 3:
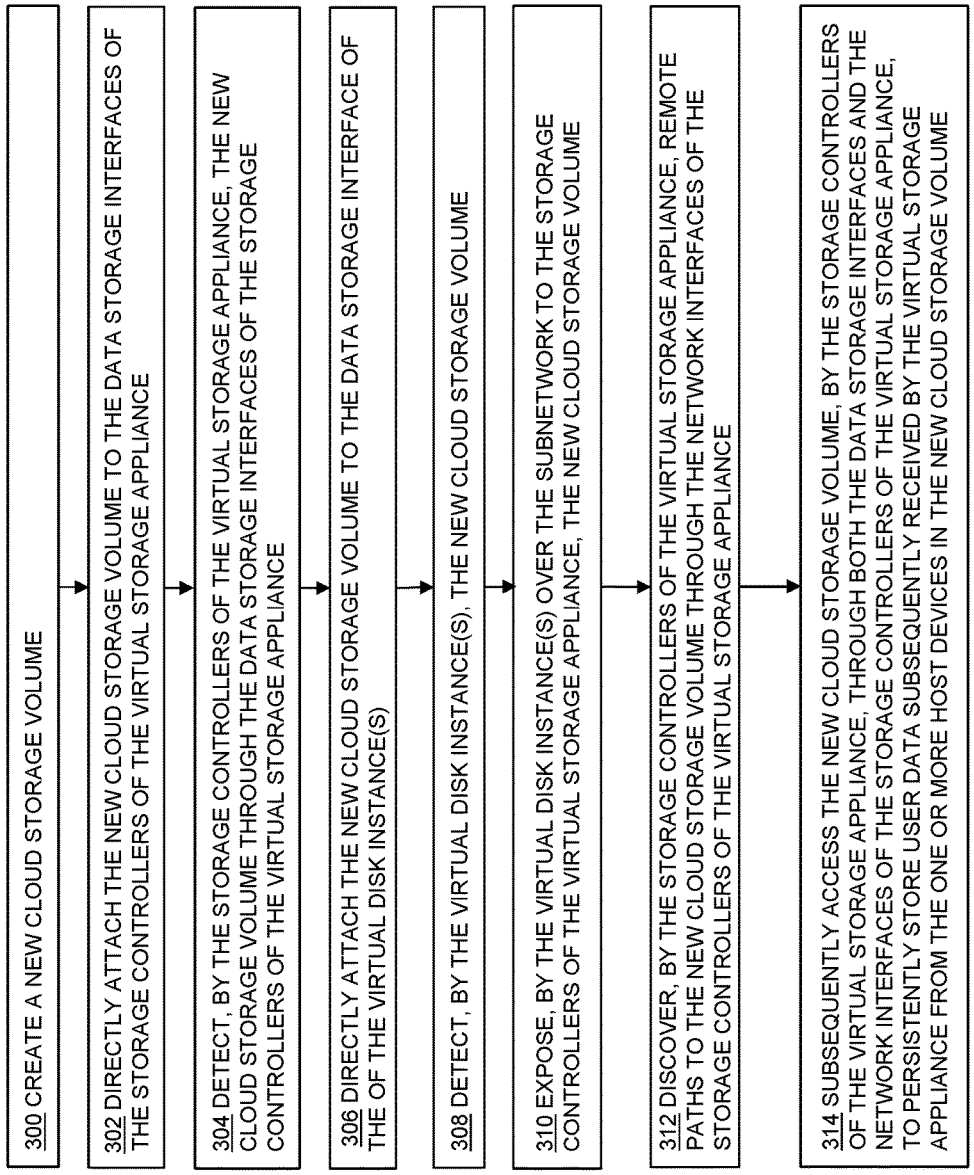
FIG. 3 is a flow chart showing an example of steps performed in some embodiments to increase a total data storage capacity of a virtual storage appliance.

FIG. 3 is a flow chart showing an example of steps performed in some embodiments to increase a total data storage capacity of a virtual storage appliance. The steps of FIG. 3 may, for example, be performed by Storage Controller Logic 124, Storage Controller Logic 134, and the NVMe-oF logic in each one of the Virtual Disk Instances 150.

At step 300, a new cloud storage volume is created, e.g. by Storage Controller Logic 124 and/or Storage Controller Logic 134.

At step 302, the newly created cloud storage volume is directly attached to the data storage interface of each one of the storage controllers of the virtual storage appliance, e.g. to the Data Storage Interface 128 of Node A 122 and the Data Storage Interface 138 of Node B 132.

At step 304, the storage controllers of Virtual Storage Appliance 120 (e.g. Node A 122 and Node B 132) detect the newly created cloud storage volume through the data storage interfaces of Node A 122 and Node B 132.

At step 306, the newly created cloud storage volume is directly attached to the data storage interface of each one of the of the virtual disk instances (e.g. to the data storage interface of each one of the virtual disk instances in Virtual Disk Instances 150).

At step 308, each one of the virtual disk instances (e.g. NVMe-oF logic in each one of the Virtual Disk Instances 150) detects the newly created cloud storage volume.

At step 310, each one of the virtual disk instances (e.g. NVMe-oF logic in each one of the Virtual Disk Instances 150) exposes, over the Subnetwork 146 to Node A 122 and Node B 132, the newly created cloud storage volume.

At step 312, the storage controllers of Virtual Storage Appliance 120 (e.g. Storage Controller Logic 124 in Node A 122 and Storage Controller Logic 134 in Node B 132) discover remote paths to the newly created cloud storage volume over Subnet 146 through the network interfaces of the storage controllers (e.g. through Network Interface 130 and Network Interface 140 respectively).

At step 314, the storage controllers of Virtual Storage Appliance 120 (e.g. Storage Controller Logic 124 in Node A 122 and Storage Controller Logic 134 in Node B 132) subsequently access the newly created cloud storage volume, through both i) local paths to the newly created cloud storage volume through their respective data storage interfaces 128 and 138 and ii) the remote paths to the newly created cloud storage volume over Subnet 146 through their respective network interfaces 130 and 140, in order to persistently store user data subsequently received by Virtual Storage Appliance 120 from the Hosts 110. Storage Controller Logic 124 in Node A 122 and/or Storage Controller Logic 134 in Node B 132 may then reduce the IOPS performance of all M+1 cloud storage volumes so that the total IOPS for the backend non-volatile data storage is the same as it was before the capacity expansion.

Figure 4:
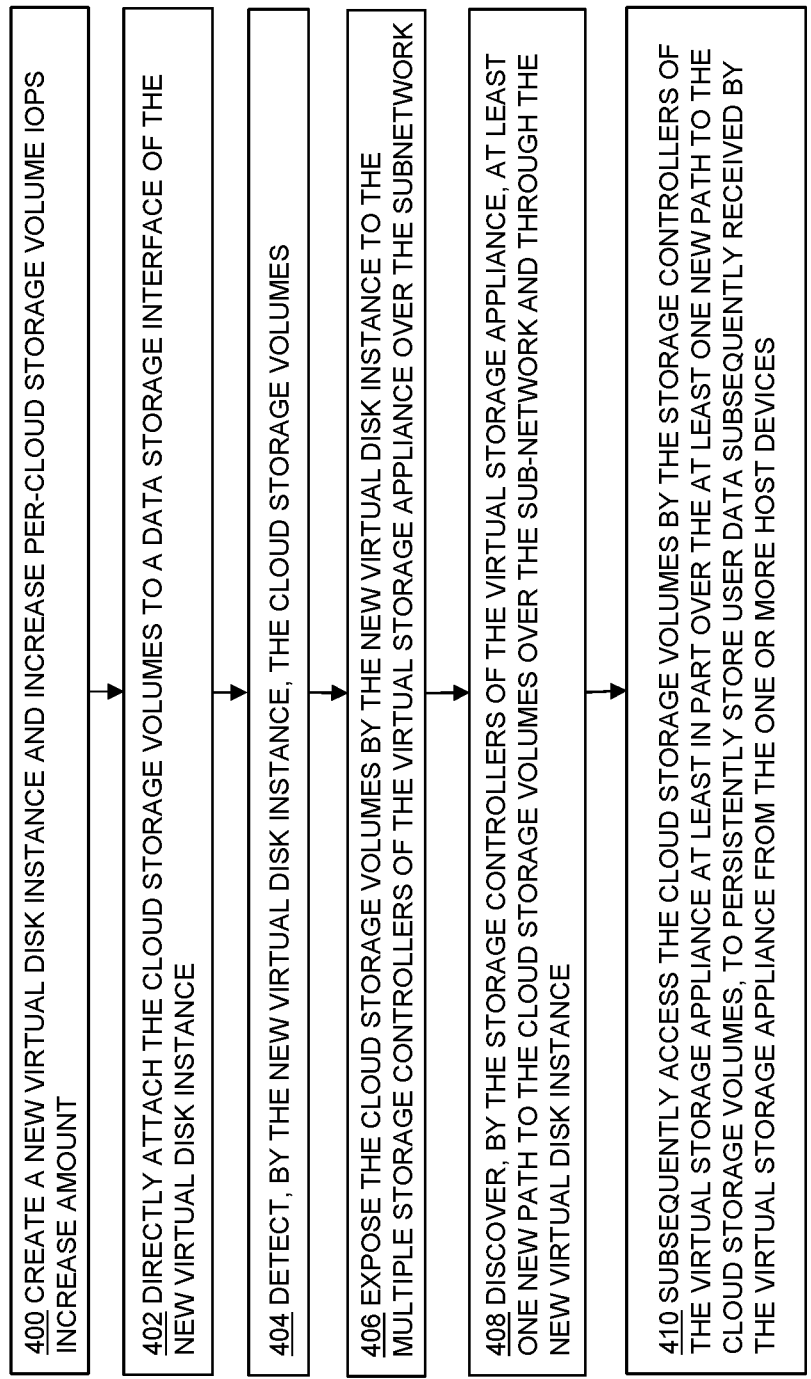
FIG. 4 is a flow chart showing an example of steps performed in some embodiments to increase performance of a virtual storage appliance.

FIG. 4 is a flow chart showing an example of steps performed in some embodiments to increase performance of the Virtual Storage Appliance 120. The steps of FIG. 4 may, for example, be performed by Storage Controller Logic 124, Storage Controller Logic 134, and the NVMe-oF logic in each one of the Virtual Disk Instances 150.

At step 400, a new virtual disk instance is created, e.g. by Storage Controller Logic 124 and/or Storage Controller Logic 134. Also at step 400, a per-cloud storage volume IOPS increment amount may be calculated, equal to the desired total desired increase in IOPS for the Virtual Storage Appliance 120 divided by the total number of cloud storage volumes (M). The IOPS of each cloud storage volume may then be increased by the per-cloud storage volume IOPS increment amount.

At step 402, the Cloud Storage Volumes 126 are all directly attached to the data storage interface of the newly created virtual disk instance At step 404, the newly created virtual disk instance detects the Cloud Storage Volumes 126.

At step 406, the newly created virtual disk instance exposes the Cloud Storage Volumes 126 to the storage controllers (to the Storage Controller Logic 124 in Node A 122 and the Storage Controller Logic 134 in Node B 132) of the Virtual Storage Appliance 120 over the Subnet 146.

At step 408, the storage controllers (the Storage Controller Logic 124 in Node A 122 and the Storage Controller Logic 134 in Node B 132) of the Virtual Storage Appliance 120 discovers a new remote path to each one of the cloud storage volumes in Cloud Storage Volumes 126 over Subnet 146 and through the newly created virtual disk instance.

At step 410, the storage controllers (the Storage Controller Logic 124 in Node A 122 and the Storage Controller Logic 134 in Node B 132) subsequently access the Cloud Storage Volumes 126 at least in part over the Subnet 146 over the new remote paths, to persistently store user data subsequently received by the Virtual Storage Appliance 120 from the Hosts 110.

Figure 5:
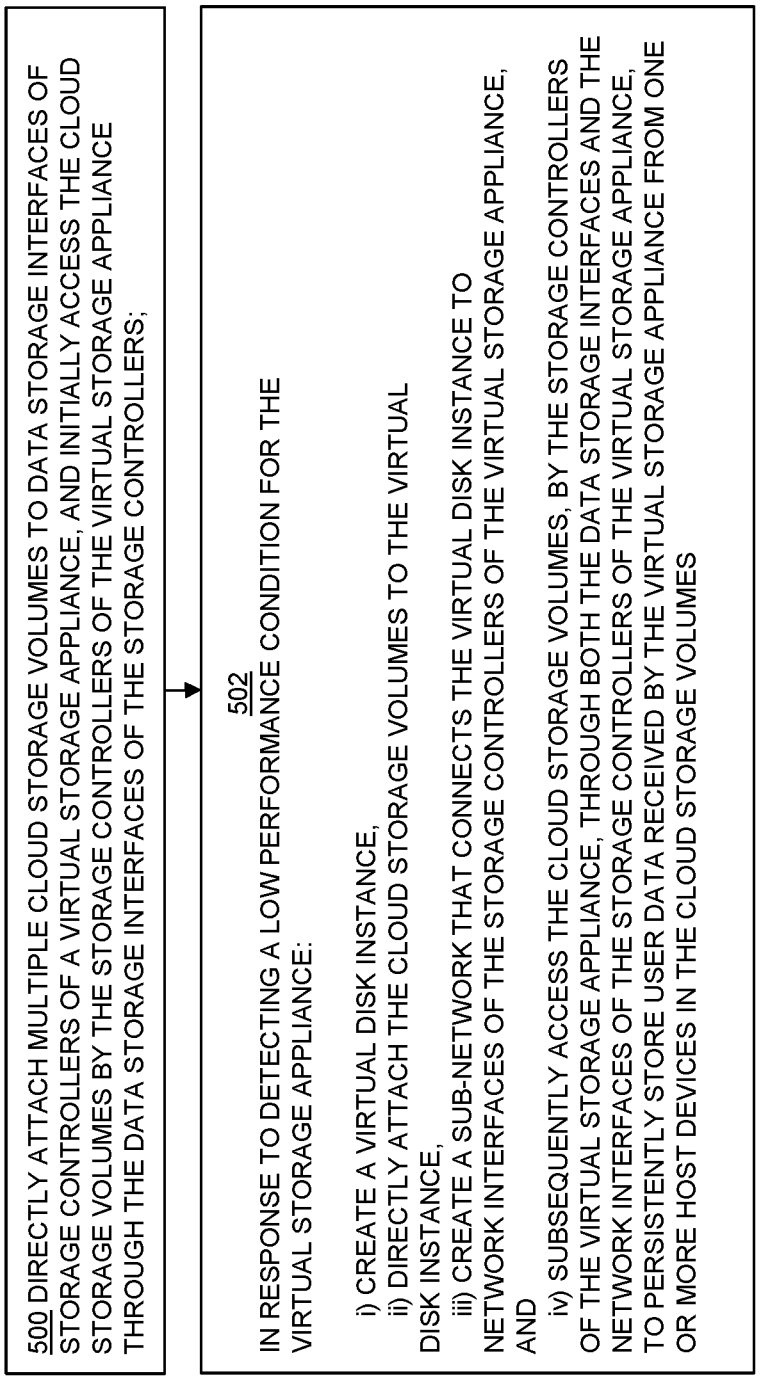
FIG. 5 is a flow chart showing an example of steps performed in some embodiments.

FIG. 5 is a flow chart showing an example of steps performed in some embodiments.

At step 500, multiple cloud storage volumes are directly attached to data storage interfaces of storage controllers of a virtual storage appliance. The cloud storage volumes are initially accessed by the storage controllers only through the data storage interfaces of the storage controllers.

At step 502, in response to detecting a low performance condition for the virtual storage appliance, the disclosed technology i) creates at least one virtual disk instance, ii) directly attaches the cloud storage volumes to the virtual disk instance, iii) creates a sub-network that connects the virtual disk instance to network interfaces of the storage controllers of the virtual storage appliance, and iv) subsequently accesses the cloud storage volumes, by the storage controllers of the virtual storage appliance, through both the data storage interfaces and the network interfaces of the storage controllers of the virtual storage appliance, to persistently store user data received by the virtual storage appliance from one or more host devices.

As will be appreciated by those skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   directly attaching a plurality of cloud storage volumes to data storage interfaces of a plurality of storage controllers of a virtual storage appliance, and initially accessing the cloud storage volumes by the storage controllers of the virtual storage appliance through the data storage interfaces of the storage controllers; and
   in response to detecting a low performance condition for the virtual storage appliance:
   creating a virtual disk instance,
   directly attaching the cloud storage volumes to the virtual disk instance,
   creating a sub-network that connects the virtual disk instance to network interfaces of the storage controllers of the virtual storage appliance, and
   subsequently accessing the cloud storage volumes, by the storage controllers of the virtual storage appliance, through both the data storage interfaces and the network interfaces of the storage controllers of the virtual storage appliance, to persistently store host data received by the virtual storage appliance from one or more host devices in the cloud storage volumes.

2. The method of claim 1, wherein each one of the cloud storage volumes is capable of being attached to multiple virtual machines;
   wherein each one of the multiple storage controllers comprises a virtual machine;
   wherein the virtual disk instance comprises a virtual machine; and
   wherein each one of the cloud storage volumes is directly attached to the virtual disk instance through a data storage interface of the virtual disk instance.

3. The method of claim 1, wherein detecting the low performance condition for the virtual storage appliance comprises detecting that access time for accessing the cloud storage volumes has exceeded a threshold access time.

4. The method of claim 1, wherein detecting the low performance condition for the virtual storage appliance comprises detecting that a queue depth of at least one queue storing host data to be persistently stored in the cloud storage volumes has exceeded a threshold queue depth.

5. The method of claim 2, further comprising:
   increasing a total data storage capacity of the virtual storage appliance at least in part by:
   calculating an amount of increase in the total data storage capacity for the virtual storage appliance,
   calculating a per-cloud storage volume increment by dividing the amount of increase in the total data storage capacity for the virtual storage appliance by a total number of the cloud storage volumes, and
   increasing a data storage capacity of each one of the cloud storage volumes by the per-cloud storage volume increment.

6. The method of claim 5, wherein increasing the total data storage capacity of the virtual storage appliance further comprises:
   detecting, by the storage controllers of the virtual storage appliance, the increased data storage capacities of the cloud storage volumes; and
   using, by the storage controllers of the virtual storage appliance, the increased data storage capacities of the cloud storage volumes to persistently store host data subsequently received by the virtual storage appliance from the one or more host devices.

7. The method of claim 2, further comprising:
   increasing a total data storage capacity of the virtual storage appliance at least in part by:
   creating a new cloud storage volume,
   directly attaching the new cloud storage volume to the data storage interfaces of the storage controllers of the virtual storage appliance,
   detecting, by the storage controllers of the virtual storage appliance, the new cloud storage volume through the data storage interfaces of the storage controllers of the virtual storage appliance,
   directly attaching the new cloud storage volume to the data storage interface of the of the virtual disk instance,
   detecting, by the virtual disk instance, the new cloud storage volume,
   exposing, by the virtual disk instance over the subnetwork to the storage controllers of the virtual storage appliance, the new cloud storage volume,
   discovering, by the storage controllers of the virtual storage appliance, the new cloud storage volume through the network interfaces of the storage controllers of the virtual storage appliance, and
   subsequently accessing the new cloud storage volume, by the storage controllers of the virtual storage appliance, through both the data storage interfaces and the network interfaces of the storage controllers of the virtual storage appliance, to persistently store host data subsequently received by the virtual storage appliance from the one or more host devices in the new cloud storage volume.

8. The method of claim 2, further comprising:
increasing IOPS (Input/Output Operations per Second) performance of the virtual storage appliance at least in part by:
creating a new virtual disk instance,
directly attaching the cloud storage volumes to a data storage interface of the new virtual disk instance,
detecting, by the new virtual disk instance, the cloud storage volumes,
exposing the cloud storage volumes by the new virtual disk instance to the multiple storage controllers of the virtual storage appliance over the subnetwork,
discovering, by the storage controllers of the virtual storage appliance, at least one new path to the cloud storage volumes over the sub-network and through the new virtual disk instance, and
subsequently accessing the cloud storage volumes by the storage controllers of the virtual storage appliance at least in part over the at least one new path to the cloud storage volumes, to persistently store host data subsequently received by the virtual storage appliance from the one or more host devices in the new cloud storage volume.

9. The method of claim 8, wherein increasing the IOPS performance of the virtual storage appliance further comprises:
calculating an amount of increase in the IOPS performance of the virtual storage appliance,
calculating a per-cloud storage volume increment by dividing the amount of increase in the IOPS performance of the virtual storage appliance by a total number of the cloud storage volumes, and
increasing an IOPS performance of each one of the cloud storage volumes by the per-cloud storage volume increment.

10. A system comprising:
a virtual storage appliance executing on a cloud computing platform, wherein the virtual storage appliance includes program code;
wherein the program code, when executed by computing resources of the cloud computing platform including at least one central processing unit, causes the computing resources to:
directly attach a plurality of cloud storage volumes to data storage interfaces of a plurality of storage controllers of the virtual storage appliance, and initially access the cloud storage volumes by the storage controllers of the virtual storage appliance through the data storage interfaces of the storage controllers, and
in response to detecting a low performance condition for the virtual storage appliance, cause the computing resources to:
create a virtual disk instance,
directly attach the cloud storage volumes to the virtual disk instance,
create a sub-network that connects the virtual disk instance to network interfaces of the storage controllers of the virtual storage appliance, and
subsequently access the cloud storage volumes, by the storage controllers of the virtual storage appliance, through both the data storage interfaces and the network interfaces of the storage controllers of the virtual storage appliance, to persistently store host data received by the virtual storage appliance from one or more host devices in the cloud storage volumes.

11. The system of claim 10, wherein each one of the cloud storage volumes is capable of being attached to multiple virtual machines;
wherein each one of the multiple storage controllers comprises a virtual machine;
wherein the virtual disk instance comprises a virtual machine; and
wherein each one of the cloud storage volumes is directly attached to the virtual disk instance through a data storage interface of the virtual disk instance.

12. The system of claim 10, wherein detection of the low performance condition for the virtual storage appliance comprises detecting that access time for accessing the cloud storage volumes has exceeded a threshold access time.

13. The system of claim 10, wherein detection of the low performance condition for the virtual storage appliance comprises detecting that a queue depth of at least one queue storing host data to be persistently stored in the cloud storage volumes has exceeded a threshold queue depth.

14. The system of claim 11, wherein the program code, when executed by the computing resources of the cloud computing platform, further causes the computing resources to increase a total data storage capacity of the virtual storage appliance by causing the computing resources to:
calculate an amount of increase in the total data storage capacity for the virtual storage appliance,
calculate a per-cloud storage volume increment by dividing the amount of increase in the total data storage capacity for the virtual storage appliance by a total number of the cloud storage volumes, and
increase a data storage capacity of each one of the cloud storage volumes by the per-cloud storage volume increment.

15. The system of claim 14, wherein the program code, when executed by the computing resources of the cloud computing platform, further causes the computing resources to increase the total data storage capacity of the virtual storage appliance by further causing the computing resources to:
detect, by the storage controllers of the virtual storage appliance, the increased data storage capacities of the cloud storage volumes; and
use, by the storage controllers of the virtual storage appliance, the increased data storage capacities of the cloud storage volumes to persistently store host data subsequently received by the virtual storage appliance from the one or more host devices.

16. The system of claim 11, wherein the program code, when executed by the computing resources of the cloud computing platform, further causes the computing resources to increase a total data storage capacity of the virtual storage appliance by causing the computing resources to:
create a new cloud storage volume;
directly attach the new cloud storage volume to the data storage interfaces of the storage controllers of the virtual storage appliance;
detect, by the storage controllers of the virtual storage appliance, the new cloud storage volume through the data storage interfaces of the storage controllers of the virtual storage appliance, directly attach the new cloud storage volume to the data storage interface of the of the virtual disk instance;

detect, by the virtual disk instance, the new cloud storage volume;

expose, by the virtual disk instance over the subnetwork to the storage controllers of the virtual storage appliance, the new cloud storage volume;

discover, by the storage controllers of the virtual storage appliance, the new cloud storage volume through the network interfaces of the storage controllers of the virtual storage appliance; and subsequently access the new cloud storage volume, by the storage controllers of the virtual storage appliance, through both the data storage interfaces and the network interfaces of the storage controllers of the virtual storage appliance, to persistently store host data subsequently received by the virtual storage appliance from the one or more host devices in the new cloud storage volume.

17. The system of claim 11, wherein the program code, when executed by the computing resources of the cloud computing platform, further causes the computing resources to increase IOPS (Input/Output Operations per Second) performance of the virtual storage appliance by causing the computing resources to:

create a new virtual disk instance;

directly attach the cloud storage volumes to a data storage interface of the new virtual disk instance;

detect, by the new virtual disk instance, the cloud storage volumes;

expose the cloud storage volumes by the new virtual disk instance to the multiple storage controllers of the virtual storage appliance over the subnetwork;

discover, by the storage controllers of the virtual storage appliance, at least one new path to the cloud storage volumes over the sub-network and through the new virtual disk instance; and subsequently access the cloud storage volumes by the storage controllers of the virtual storage appliance at least in part over the at least one new path to the cloud storage volumes, to persistently store host data subsequently received by the virtual storage appliance from the one or more host devices in the new cloud storage volume.

18. The system of claim 17, wherein the program code, when executed by the computing resources of the cloud computing platform, further causes the computing resources to increase the IOPS performance of the virtual storage appliance by causing the computing resources to:

calculate an amount of increase in the IOPS performance of the virtual storage appliance;

calculate a per-cloud storage volume increment by dividing the amount of increase in the IOPS performance of the virtual storage appliance by a total number of the cloud storage volumes, and increase an IOPS performance of each one of the cloud storage volumes by the per-cloud storage volume increment.

19. A computer program product including a non-transitory computer readable medium having instructions stored thereon, wherein the instructions, when executed on processing circuitry, cause the processing circuitry to perform steps including:

directly attaching a plurality of cloud storage volumes to data storage interfaces of a plurality of storage controllers of a virtual storage appliance, and initially accessing the cloud storage volumes by the storage controllers of the virtual storage appliance through the data storage interfaces of the storage controllers; and in response to detecting a low performance condition for the virtual storage appliance:

creating a virtual disk instance, directly attaching the cloud storage volumes to the virtual disk instance, creating a sub-network that connects the virtual disk instance to network interfaces of the storage controllers of the virtual storage appliance, and subsequently accessing the cloud storage volumes, by the storage controllers of the virtual storage appliance, through both the data storage interfaces and the network interfaces of the storage controllers of the virtual storage appliance, to persistently store host data received by the virtual storage appliance from one or more host devices in the cloud storage volumes.

* * * * *